(12) United States Patent
Zhang et al.

(10) Patent No.: US 11,096,079 B2
(45) Date of Patent: Aug. 17, 2021

(54) CELL MEASUREMENTS USING CONFIGURED REFERENCE SIGNALS WHILE IN RRC INACTIVE MODE

(71) Applicant: Apple Inc., Cupertino, CA (US)

(72) Inventors: Wei Zhang, Santa Clara, CA (US); Haitong Sun, Irvine, CA (US); Fangli Xu, Beijing (CN); Pengkai Zhao, San Jose, CA (US); Junsung Lim, San Jose, CA (US); Wei Zeng, San Diego, CA (US); Haijing Hu, Beijing (CN); Sami M. Almalfouh, San Jose, CA (US); Dawei Zhang, Saratoga, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/553,361

(22) Filed: Aug. 28, 2019

(65) Prior Publication Data
US 2020/0137602 A1    Apr. 30, 2020

Related U.S. Application Data

(60) Provisional application No. 62/751,970, filed on Oct. 29, 2018.

(51) Int. Cl.
*H04W 24/10* (2009.01)
*H04L 5/00* (2006.01)
(Continued)

(52) U.S. Cl.
CPC .......... *H04W 24/10* (2013.01); *H04L 5/0048* (2013.01); *H04W 52/0229* (2013.01);
(Continued)

(58) Field of Classification Search
CPC ............ H04W 24/10; H04W 52/0229; H04W 72/042; H04W 76/27; H04W 88/08; H04L 5/0048
See application file for complete search history.

(56) References Cited

U.S. PATENT DOCUMENTS

| 9,345,039 B2 | 5/2016 | Pelletier et al. |
| 10,142,980 B2 | 11/2018 | Radulescu et al. |

(Continued)

FOREIGN PATENT DOCUMENTS

| GB | 2507821 A | 5/2014 |
| WO | WO2018085144 A1 | 5/2018 |

(Continued)

*Primary Examiner* — Ajay Cattungal
(74) *Attorney, Agent, or Firm* — Kowert, Hood, Munyon, Rankin & Goetzel, P.C.

(57) ABSTRACT

This disclosure relates to performing cell measurements using configured reference signals while in an inactive state in a cellular communication system. A wireless device may receive an indication of reference signal resources configured for use by the wireless device in the inactive state from a cellular base station that provides a serving cell to the wireless device. The reference signal resources may include channel state information reference signal resources that are aligned in time and/or frequency with a control resource set provided for a wakeup occasion of the wireless device while in the inactive state. The wireless device may perform cell measurements using the indicated reference signal resources while in the inactive state.

20 Claims, 6 Drawing Sheets

(51) Int. Cl.
*H04W 52/02* (2009.01)
*H04W 72/04* (2009.01)
*H04W 76/27* (2018.01)
*H04W 88/08* (2009.01)

(52) U.S. Cl.
CPC ......... *H04W 72/042* (2013.01); *H04W 76/27* (2018.02); *H04W 88/08* (2013.01)

(56) References Cited

U.S. PATENT DOCUMENTS

| | | | |
|---|---|---|---|
| 2018/0139787 A1* | 5/2018 | Islam | H04W 48/16 |
| 2018/0176958 A1* | 6/2018 | Islam | H04W 56/00 |
| 2019/0029049 A1* | 1/2019 | Akkarakaran | H04W 74/0833 |
| 2019/0053271 A1 | 2/2019 | Islam et al. | |
| 2019/0069285 A1* | 2/2019 | Chandrasekhar | H04B 7/0695 |
| 2019/0141546 A1 | 5/2019 | Zhou et al. | |
| 2019/0149365 A1 | 5/2019 | Chatterjee et al. | |
| 2019/0268060 A1* | 8/2019 | Nam | H04B 7/0695 |
| 2019/0306739 A1* | 10/2019 | Kim | H04W 76/15 |
| 2020/0029238 A1* | 1/2020 | Si | H04W 76/27 |
| 2020/0120521 A1* | 4/2020 | da Silva | H04L 5/0048 |
| 2020/0154327 A1* | 5/2020 | Koskela | H04B 7/0617 |
| 2020/0374725 A1* | 11/2020 | Chen | H04B 7/0626 |

FOREIGN PATENT DOCUMENTS

| | | |
|---|---|---|
| WO | WO2019027242 A1 | 2/2019 |
| WO | WO2019051177 A1 | 3/2019 |
| WO | WO2019094781 A2 | 5/2019 |

\* cited by examiner

CELL MEASUREMENTS USING CONFIGURED REFERENCE SIGNALS WHILE IN RRC INACTIVE MODE

PRIORITY INFORMATION

This application claims priority to U.S. provisional patent application Ser. No. 62/751,970, entitled "Cell Measurements Using Configured Reference Signals while in RRC Inactive Mode," filed Oct. 29, 2018, which is hereby incorporated by reference in its entirety as though fully and completely set forth herein.

FIELD

The present application relates to wireless communications, and more particularly to systems, apparatuses, and methods for performing cell measurements while in an inactive state in a cellular communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments are presented herein of apparatuses, systems, and methods for performing cell measurements while in an inactive state in a cellular communication system.

According to the techniques described herein, a cellular base station providing a cell to a wireless device may configure reference signal resources for the wireless device to use while in the inactive state. The cellular base station may indicate to the wireless device which reference signal resources are configured for the wireless device, for example when releasing the wireless device from a connected to the inactive state, or during a wakeup occasion of the wireless device while in the inactive state.

The reference signal resources may be aligned (e.g., in time) with a wakeup occasion of the wireless device while in the inactive state, and may further be aligned (e.g., in frequency) with control resources provided during the wakeup occasion, at least in some instances. For example, such alignment in time/frequency may help to better support power efficient use of the reference signal resources by the wireless device. Additionally or alternatively, such alignment may help to better support maintaining the transmit and/or receive beamforming alignment of the wireless device while in the inactive state, which may reduce the potential delay to resuming operating in the connected state to perform data communication.

The reference signal resources may be used by the wireless device to perform cell measurements while in the inactive state. The wireless device may further provide cell measurement reports to the serving cell based on the cell measurements. In some instances, such cell measurements may be used to determine when to perform cell re-selection, when to modify beam configuration, and/or for various other purposes. The reference signal resources could include either or both of downlink reference signals (such as channel state information reference signals) or uplink reference signals (such as sounding reference signals), e.g., to help support either or both of uplink and downlink channel monitoring.

Such use of configured reference signals while in an inactive state may be regulated using an inactive mode inactivity timer, if desired. For example, while use of configured reference signals may result in more accurate cell measurements and beam maintenance (among other possible benefits) relative to use of synchronization signals, there may also be a higher network resource cost to providing such dedicated resources relative to relying on use of synchronization signals, at least in some instances. Accordingly, it may be beneficial, according to some embodiments, to provide configured reference signals to a wireless device for a certain period of time after entering the inactive state (e.g., when there is a higher likelihood that the wireless device will resume operating in the connected state to perform further data communication), and subsequently (e.g., when there is a lower likelihood that the wireless device will resume operating in the connected state to perform further data communication) cease providing configured reference signals to the wireless device while the wireless device is in inactive mode. Thus, an inactive mode inactivity timer could be used support such differentiation of portions of a wireless device's operation in the inactive state, e.g., by providing configured reference signals while the inactive mode inactivity timer is running, and not providing configured reference signals after expiry of the inactive mode inactivity timer.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
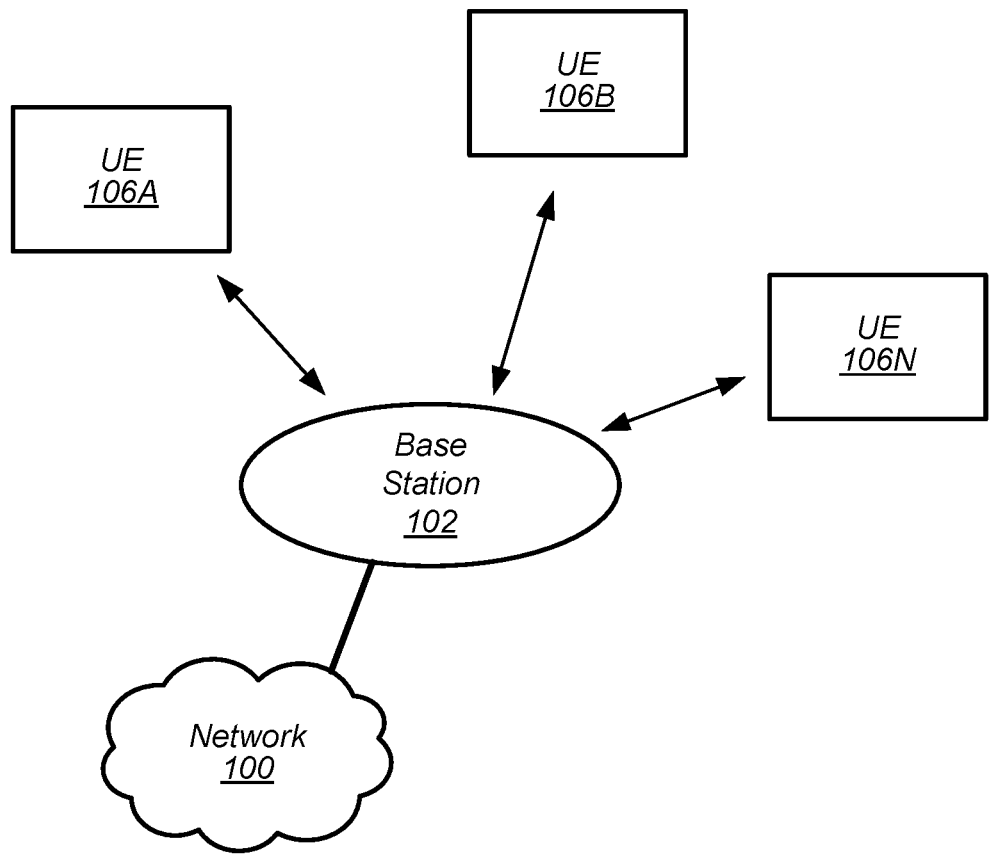
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present dislosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
RAN: Radio Access Network
RNA: RAN Notification Area
TX: Transmission/Transmit
RX: Reception/Receive
LAN: Local Area Network
WLAN: Wireless LAN
AP: Access Point
RAT: Radio Access Technology
IEEE: Institute of Electrical and Electronics Engineers
Wi-Fi: Wireless Local Area Network (WLAN) RAT based on the IEEE 802.11 standards Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
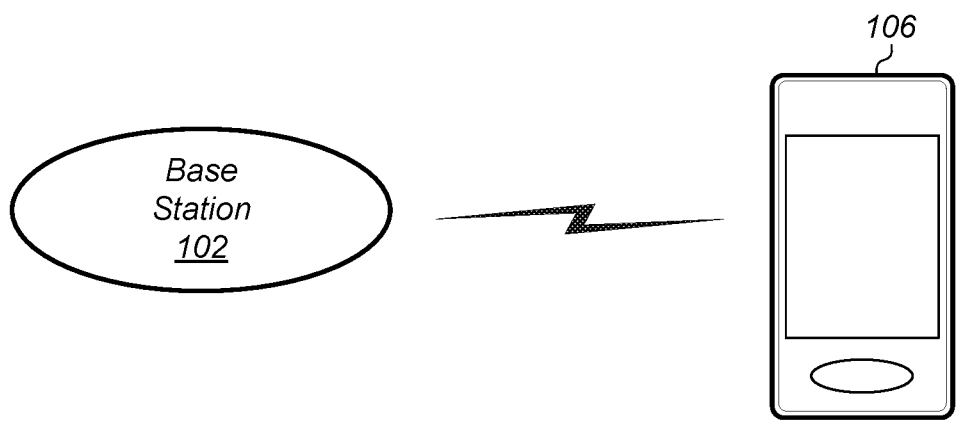
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

In some embodiments, the UE 106 may be configured to perform cell measurements using configured reference signals while operating in an RRC inactive mode, at least according to the various methods as described herein.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
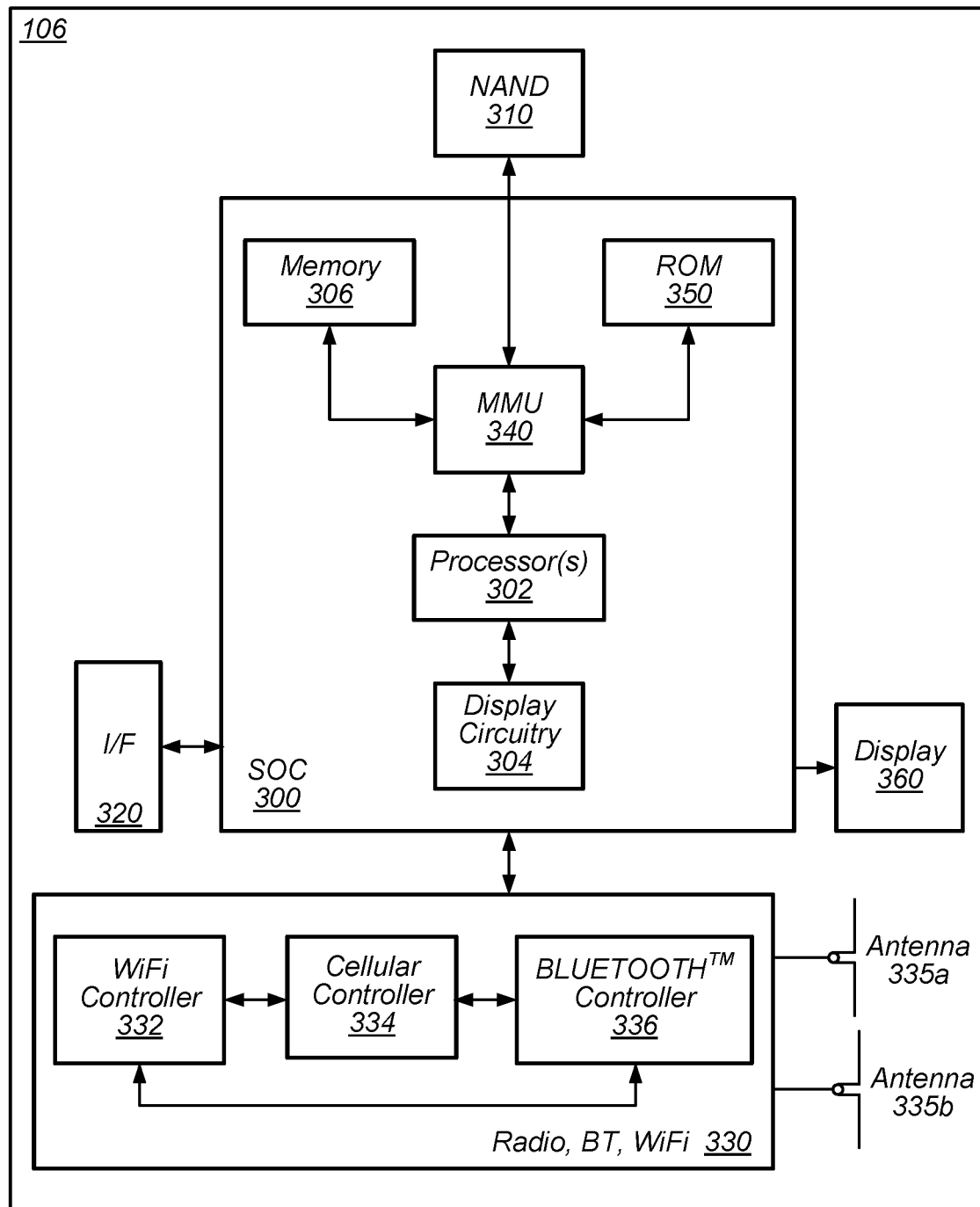
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to perform cell measurements using configured reference signals while in an inactive state in a cellular communication system. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform cell measurements using configured reference signals while in an inactive state in a cellular communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 332, a cellular controller (e.g. NR controller) 334, and BLUETOOTH™ controller 336, and in at least some embodiments, one or more or all of these controllers may be implemented as respective integrated circuits (ICs or chips, for short) in communication with each other and with SOC 300 (and more specifically with processor(s) 302). For example, Wi-Fi controller 332 may communicate with cellular controller 334 over a cell-ISM link or WCI interface, and/or BLUETOOTH™ controller 336 may communicate with cellular controller 334 over a cell-ISM link, etc. While three separate controllers are illustrated within radio 330, other embodiments have fewer or more similar controllers for various different RATs that may be implemented in UE device 106.

Figure 4:
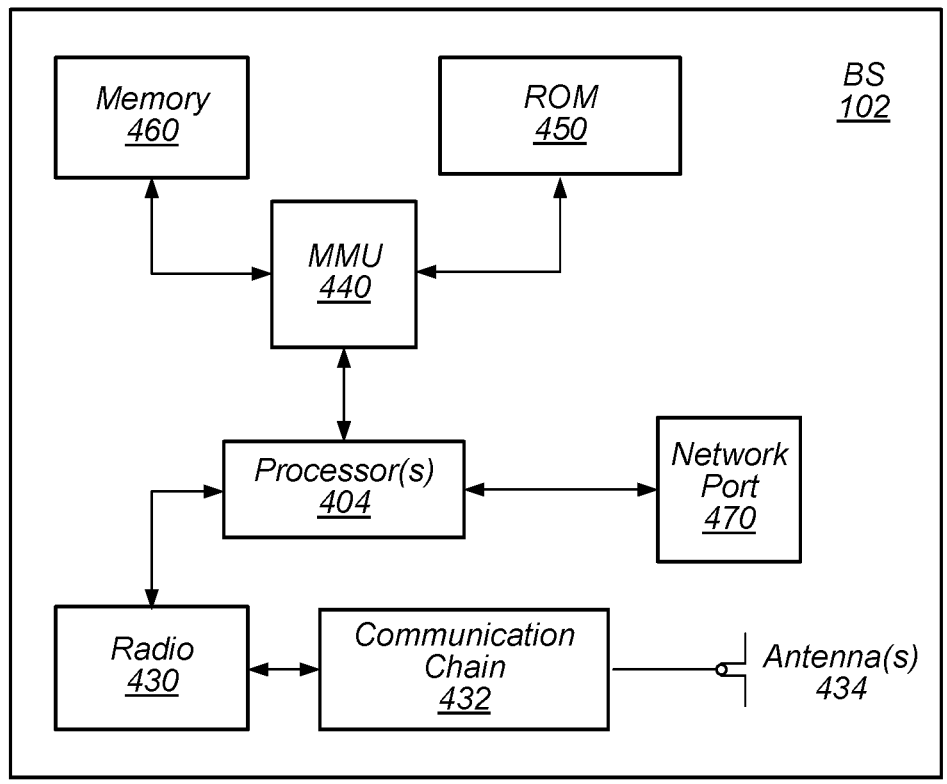
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for wireless devices to perform cell measurements using configured reference signals while in an inactive state in a cellular communication system.

Figure 5:
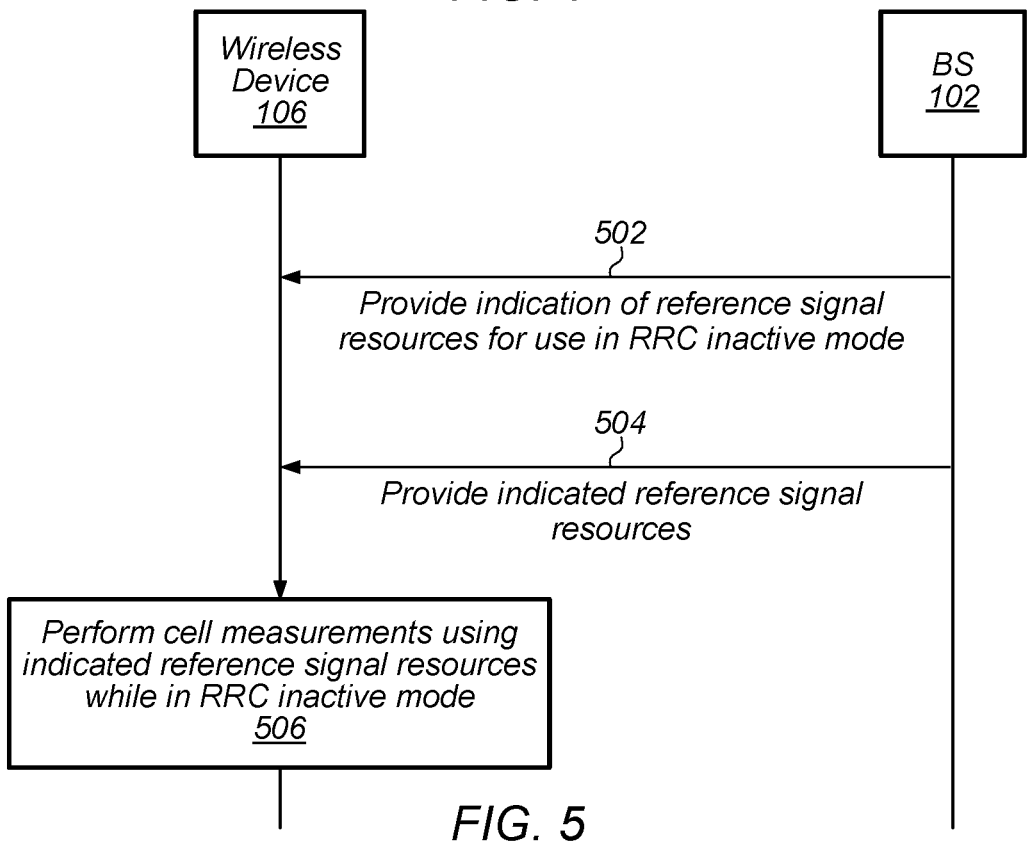
FIG. 5 is a communication flow diagram illustrating an exemplary possible method for performing cell measurements using configured reference signals while in an inactive state in a cellular communication system, according to some embodiments.

FIG. 5—Cell Measurements Using Configured Reference Signals While in an Inactive State Multiple cellular communication technologies include the use of a radio resource control (RRC) protocol, e.g., which may facilitate connection establishment and release, radio bearer establishment, reconfiguration, and release, and/or various other possible signaling functions supporting the air interface between a wireless device and a cellular base station.

A wireless device may commonly operate in one of multiple possible states with respect to RRC. For example, in LTE, a wireless device may operate in an RRC connected state (e.g., in which the wireless device can perform continuous data transfer, and in which handover between cells is managed by the network and access stratum context information is retained for the wireless device), or in an RRC idle state (e.g., in which the wireless device may operate in a more battery efficient state when not performing continuous data transfer, in which the wireless device may handle it's cell re-selection activities, and in which the network may not retain access stratum context information for the wireless device).

In addition to RRC connected and RRC idle states, it may also be possible to support one or more other types of RRC states for a wireless device, at least according to some embodiments. For example, for NR, an RRC inactive state in which a wireless device may be able to operate in a relatively battery efficient state while the network also retains at least some access stratum context information may be supported. At least according to some embodiments, such a state may employ wireless device based mobility, e.g., such that a wireless device can move within a radio access network notification area (RNA) without notifying the next generation (NG) radio access network (RAN). While in this state, a wireless device may perform cell re-selection and system information acquisition for itself. At the same time, the last serving base station (e.g., gNB) may keep the wireless device context and the NG connection with the 5G core network (CN) associated with the wireless device, e.g., to facilitate easier transition back to an RRC connected state. When paging a wireless device in RRC inactive mode, RNA specific parameters may be used by the RAN, for example including a UE specific DRX and UE Identity Index value (e.g., I-RNTI).

A wireless device operating in such an RRC inactive mode may perform RNA updates periodically (e.g., based on a configured periodic RNA update timer) and/or in an event based manner, e.g., when the wireless device moves out of its current configured RNA to a different RNA, according to some embodiments.

Use of an RRC inactive state may help reduce the network signaling overhead for a wireless device's connection, at least in some instances. For example, for a wireless device with infrequent data transmissions, utilizing such an RRC inactive state may reduce the amount of mobility related signaling (e.g., for handovers) needed compared to an RRC connected state, e.g., since the wireless device may be able to manage it's own cell re-selection process when moving betwen cells. For such a wireless device, utilizing an RRC inactive state may also reduce the amount of connection setup related signaling needed compared to an RRC idle state, e.g., since the network may retain at least some context information for the wireless device. This may directly reduce the signaling latency associated with a transition to an RRC connected state.

As another potential benefit, such a state may reduce the control plane delay for a wireless device, e.g., in comparison to operating in an RRC idle state. For example, a reduced access stratum connection setup period and/or non-access stratum connection setup period may be possible for an RRC inactive state relative to an RRC idle state. The time to move from a battery efficient state to the start of continuous data transfer may thus be reduced.

Additionally, such a state may improve the power saving capability of a wireless device, e.g., in comparison to operating in an RRC connected state. For example, while in RRC connected mode, serving and/or neighboring cell measurements may be required more frequently than while in RRC inactive state, e.g., at least in line with a connected mode discontinuous reception (C-DRX) period of the wireless device.

As noted previously herein, in the RRC inactive state, a wireless device may manage its own cell re-selection process. This process may be performed in a similar manner as LTE (or other legacy cellular technologies like WCDMA/GSM) cell re-selection while in an RRC idle state, at least in some aspects, and/or may differ from such cell re-selection techniques in some aspects. A goal of the cell re-selection process may include keeping a wireless device camped on a suitable cell, which may include a cell with sufficient signal strength, signal quality, and/or other characteristics such that the wireless device may be able to establish/activate a connection and perform data transfer via the cell. Cell re-selection may include either or both of intra-frequency cell re-selection or inter-frequency cell re-selection.

As part of managing its cell re-selection process while in such an RRC inactive state, a wireless device may perform cell measurements on serving and/or neighboring cells. The manner in which these cell measurements are performed can potentially have a substantial impact on wireless device power consumption and the amount of time needed to access continuous data transfer capability (e.g., by resuming operation in RRC connected mode). For example, if synchronization signal blocks (SSBs) are used to perform cell measurements, there may be a delay between a wireless device's inactive mode wakeup instance and the next SSB burst, and/or measurements may be performed over a relatively long period of time to allow for receiver beam sweeping over multiple SSB bursts. Further, such SSB bursts may be performed at a different frequency and/or at a wider bandwidth than the wireless device's specified inactive mode wakeup instance. Alternatively, a cellular base station could provide paging instances that are aligned with SSBs in time and/or frequency domains, e.g., to facilitate reduced wireless device power consumption in RRC inactive mode. However, this may (possibly substantially) reduce the paging capacity of the cell, which may be problematic, e.g., if there are also wireless devices in RRC idle mode expecting paging instances that are aligned with SSBs.

As an alternative to using SSBs to perform cell measurements while operating in RRC inactive mode, reference signals configured for the wireless device by the network could be used, at least according to some embodiments. FIG. 5 is a communication flow diagram illustrating such a method for a wireless device (e.g., a wireless user equipment (UE) device) to perform cell measurements using configured reference signals while in an inactive state in a cellular communication system, which may help reduce wireless device power consumption and/or reduce the access time delay from RRC inactive mode, at least according to some embodiments.

Aspects of the method of FIG. 5 may be implemented by a wireless device, e.g., in conjunction with a cellular base station, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with NR and/or 3GPP specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the cellular base station may provide an indication of reference signal resources for use in RRC inactive mode to the wireless device. The indicated reference signal resources may include resources provided (assigned/allocated) specifically to the wireless device, e.g., in contrast to synchronization signal block transmissions that may be broadcast, at least according to some embodiments. In other words, the indicated reference signal resources may be dedicated reference signal resources provided for the wireless device, at least in some embodiments.

The reference signal resources indicated may include a semi-persistent or persistent periodic set of reference signal resources, according to some embodiments. For example, the reference signal resources may include resources aligned in time and/or frequency with a control resource set provided for a wakeup occasion of the wireless device while in the RRC inactive mode, for each of multiple such periodic wakeup occasions. Additionally or alternatively, the reference signal resources indicated may include an aperiodic set of reference signal resources, e.g., to facilitate a one-time cell measurement and/or to provide additional resources for a more thorough cell measurement (e.g., including receive beam sweeping).

The reference signal resources may include one or more types of reference signal resources. As one possibility, the reference signal resources may include channel state information reference signal (CSI-RS) resources. Such resources may be used by the wireless device to perform channel measurements for a communication channel between the wireless device and a cell provided by the cellular base station. At least according to some embodiments, such resources may (e.g., at least initially) be provided using the same beam configuration as used by the wireless device while in RRC connected mode prior to transitioning to RRC inactive, or otherwise using a beam configuration specifically selected for the wireless device, e.g., based on channel state information previously reported to the base station by the wireless device. As another (e.g., additional or alternative) possibility, the reference signal resources may include resources configured for the wireless device to transmit sounding reference signals (SRS) in the RRC inactive mode. For example, it may be useful, at least in some instances, to provide semi-persistent periodic resources for transmitting SRS along a similar timeline as the CSI-RS are provided for performing cell measurements.

The indication may be provided at any of various possible times/in any of various possible ways. As one possibility, the indication may be provided in downlink control information during a wakeup occasion of the wireless device while in the RRC inactive mode. As another possibility, the indication may be provided when transitioning the wireless device from RRC connected mode to RRC inactive mode, e.g., after an RRC connection was previously established between the wireless device and the cellular base station, for example in a RRC connection release message.

Note that establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station, at least according to some embodiments. After establishing the RRC connection, the wireless device may operate in an RRC connected state. While in the RRC connected state, the wireless device may undergo handover from one serving cell (e.g., provided by a cellular base station) to another serving cell (e.g., provided by a different cellular base station), at least in some embodiments.

Transitioning from the RRC connected mode to the RRC inactive mode may include the wireless device receiving an indication deactivating the RRC connection, and/or otherwise determining that a trigger has occurred to deactivate the RRC connection. Based at least in part on the indication (and/or other trigger), the wireless device may transition from the RRC connected state to an RRC inactive state. The indication may be received from a cellular base station (e.g., the base station with which the RRC connection was established, or possibly a different cellular base station if handover has occurred one or more times). While in the RRC inactive state, the wireless device may be paged by the cells of the current RNA if the network has data for the wireless device based on the wireless device's association with the current RNA.

In 504, the base station may provide the indicated reference signal resources. For example, the base station may provide CSI-RS resources in conjunction with a physical downlink control channel (PDCCH) transmission during a wakeup occasion of the wireless device while in the RRC inactive mode, possibly using resources that are aligned in frequency with the PDCCH transmission, as one possibility, e.g., if the indicated reference signal resources include such resources.

In 506, the wireless device may perform cell measurements using the indicated reference signal resources while in the RRC inactive state. The cell measurements may be performed using a beam configuration associated with the indicated reference signal resources, e.g., which may be selected specifically for the wireless device.

At least according to some embodiments, if the cellular base station retains transmit/receive beam information for the wireless device and uses such a beam configuration to provide the reference signal resources, e.g., in contrast to a more generic (e.g., non-device-specific) configuration such as might be used for synchronization signal block transmissions, the cell measurements may more accurately reflect the cell signal strength and/or quality of the cell provided by the cellular base station at the wireless device.

In some instances, the cell measurements may also or alternatively include additional cell measurement events, such as more extended cell measurements, cell measurements performed using a receiver beam sweep, neighbor cell measurements, etc. For example, as previously noted, in some instances additional aperiodic reference signal resources may be provided by the cellular base station on certain occasions. Such additional aperiodic reference signal resources and/or additional cell measurement events may be provided when CSI-RS quality falls below a certain threshold, as one possibility, and/or based at least in part on any number of other possible considerations.

According to some embodiments, it may be possible to provide resources for the wireless device to provide a cell measurement report (e.g., indicating results of the cell measurements) to the cellular base station while in the RRC inactive mode. In such a scenario, the wireless device may provide cell measurement reports to the cellular base station while in the RRC inactive mode. Alternatively, the wireless device may transition back to RRC connected mode to provide cell measurement reports, in some embodiments.

As previously noted, while in RRC inactive mode, it may be the case that the wireless device re-selects to a new cell. In some instances, in such a scenario, the wireless device may provide a RNA update to the network, e.g., even if performing cell re-selection within the same RNA. This may help facilitate continued provision of CSI-RS (and/or other reference signal) resources to the wireless device while in RRC inactive mode even after transitioning to a new cell. For example, the cellular base station providing the new cell may provide an indication of new reference signal resources for use by the wireless device in the RRC inactive mode, and the wireless device may perform cell measurements using the new reference signal resources while in the RRC inactive mode. Note that such an indication of new reference signal resources may be provided after a cell re-selection or in any of various other instances, according to various embodiments.

In some instances, such provision and use of reference signal resources allocated to a wireless device while in RRC inactive mode may be performed in conjunction with an RRC inactive mode inactivity timer. For example, an RRC inactive mode inactivity timer may be initiated after a transition to the RRC inactive mode from the RRC connected mode, according to some embodiments. Such a timer may be reset when the RRC state changes and/or when the wireless device has downlink or uplink traffic, among various possibilities. As long as the RRC inactive mode inactivity timer for a wireless device has not yet reached expiry, reference signal resources allocated to the wireless device may be configured, and the wireless device may use such resources to perform cell measurements, while in RRC inactive mode. Once the RRC inactive mode inactivity timer expires, the wireless device may perform cell measurements using synchronization signal block transmissions. For example, in some instances, once the RRC inactive mode inactivity timer expires, the wireless device may transition to RRC idle mode, and perform the cell measurements using synchronization signal block transmissions while operating in the RRC idle mode. As another possibility, the wireless device may remain in RRC inactive after the RRC inactive mode inactivity timer expires (e.g., transitions to RRC idle may be controlled by a different timer and/or other mechanism), and may perform the cell measurements using synchronization signal block transmissions while operating in the RRC inactive mode.

FIGS. 6-10—Additional Information

FIGS. 6-10 and the following information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

RRC inactive mode is an operating mode supported in 5G NR, which may reduce signaling overhead and power consumption for a UE relative to RRC connected mode while improving the UE access latency relative to RRC idle mode. Transitions between RRC inactive and connected modes may be performed without impacting the core network. The UE and the NG RAN may store the UE access stratum context while a UE is in RRC inactive. Mobility in RRC inactive may be handled in a UE centric manner, e.g., similar to RRC idle mode, with cell re-selection being performed by the UE. Such mobility activities and the precise RRC state of a UE may be hidden to the core network. State changes from RRC inactive to RRC connected and vice versa may be possible, as well as changes from RRC inactive to RRC idle. Note that transitions from RRC idle to RRC inactive may not be supported, at least in some instances.

Similar to the core network tracking area concept used to support UE mobility in idle mode, inactive mode may use a RAN notification area (RNA), which may be configured by the gNB on a per UE basis. A UE may be reachable within its configured RNA via a RAN-initiated paging using a RAN configured UE ID (I-RNTI). RNA updates may be triggered periodically and when moving outside of the configured RNA.

Cell re-selection while in RRC inactive mode may be based on SSB quality measurements by the UE. For example, a maximum number of beams and threshold based approach for a UE to perform cell measurements using SSBs may be specified in 3GPP 38.304 Section 5.2.1.

Using SSBs as the only metric for cell (re-)selection may have some disadvantages. For example, SSB bursts may not be well aligned with the inactive mode wakeup instance (in frequency and/or in time) of a UE, which may lead to power efficiency loss at the UE. Additionally, such a technique may include the UE performing a receiver beamforming sweep, which may occur over a multiple of the SSB burst periodicity (which could be 20 ms, or any of various other possible lengths), which may increase UE access delay. Further, SSB beamforming direction may be generally wider than CSI-RS beams (e.g., such as might be used when in connected mode), which may lead to unfair cell quality loss when transitioning from connected to inactive mode, which may also increase UE access delay.

Figure 6:
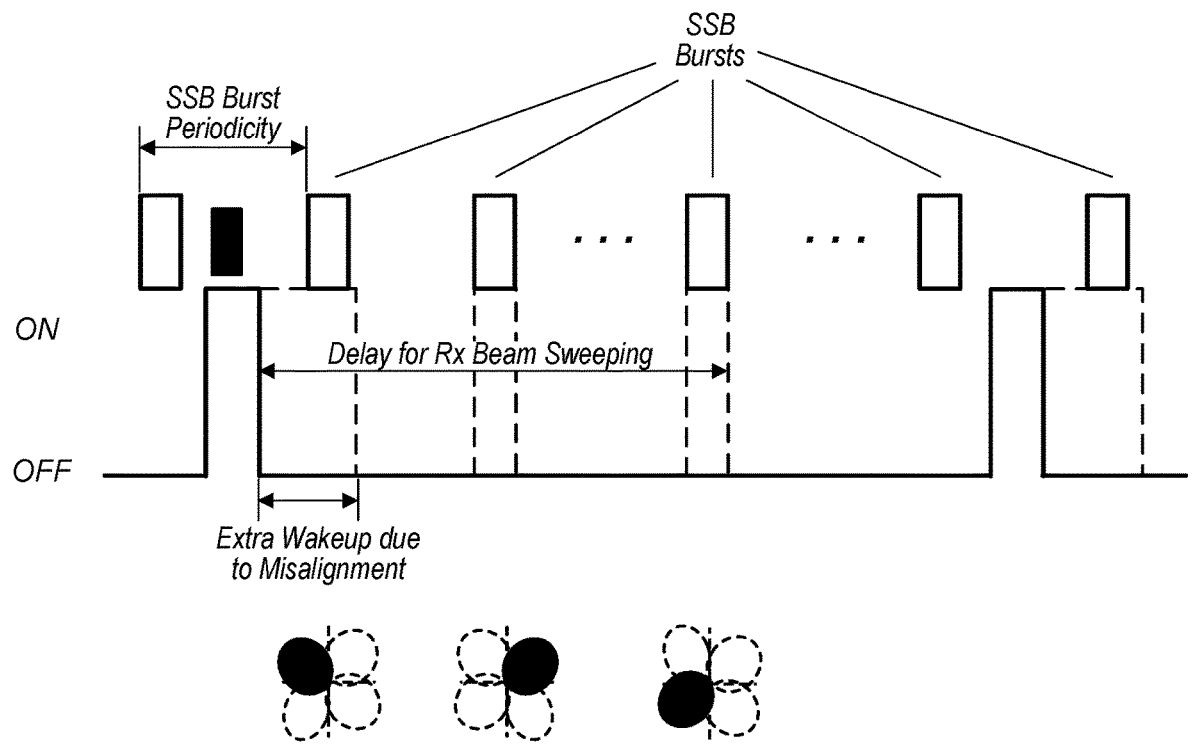
FIGS. 6-7 illustrate exemplary aspects of a possible approach to performing cell measurements while in an inactive state using synchronization signal blocks, according to some embodiments.
Figure 7:
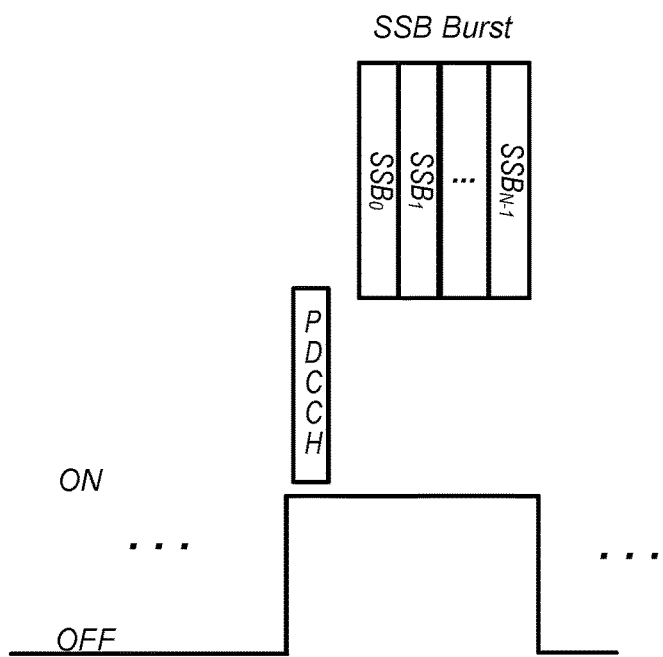

FIGS. 6-7 illustrate certain aspects of such a possible approach to performing cell measurements while in inactive mode. In particular, FIG. 6 illustrates that the SSB time offset from the wakeup instance can lead to extra wakeup time, as well as the potential access delay that may be caused by receiver beam sweeping across multiple SSB bursts. FIG. 7 illustrates that the SSB frequency offset from the paging signal can lead to a wider wakeup bandwidth.

Thus, it may be possible that cell/beamforming metrics for measurement in inactive mode could be revisited to improve overall system design. As one option, it may be possible to adopt channel state information reference signals (CSI-RS) for inactive mode cell measurements. For example, the network (e.g., a serving gNB) may configure periodic CSI-RS resources for the UE in RRC inactive mode for measurement purposes. Assigning such CSI-RS resources may help with maintaining the best transmit and receive beamforming arrangement for the UE while in RRC inactive, which may reduce access delays. Additionally, by aligning the CSI-RS resources (e.g., in either or both of time and frequency) with the inactive mode wakeup instances, it may be possible to obtain substantial UE power consumption reductions.

CSI-RS resources can be provided on the default bandwidth part (BWP) assigned to the UE to further save power. At least according to some embodiments, tracking reference signals can also be added earlier or with the control resource set (CORESET) search space for the UE to serve as an automatic gain control (AGC) reference signal.

Figure 8:
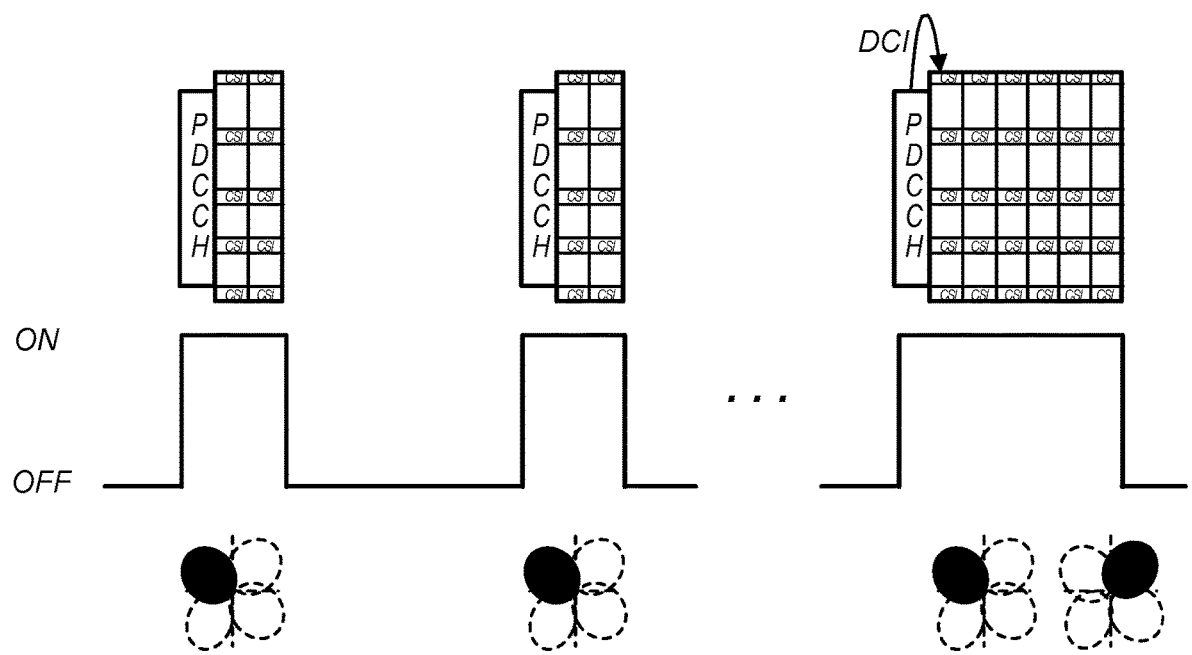
FIGS. 8-10 illustrate exemplary aspects of a possible approach to performing cell measurements while in an inactive state using configured reference signals, according to some embodiments.

Measurement events can be configured to be triggered when the CSI-RS quality is lower than a preset threshold, as one possibility. When reported, downlink control information (DCI) can either assign aperiodic CSI-RS or activate previously configured CSI-RS for P1/P2/P3 procedure, e.g., to facilitate recovery to a better cell and/or beamforming arrangement. As an example, FIG. 8 illustrates a possible communication timeline in which additional CSI-RS resources are provided using DCI to support a receiver beam sweep during an inactive mode wakeup instance by a wireless device.

In some instances, it may be possible to provide measurement reports on the uplink while in the RRC inactive mode (e.g., without going back to RRC connected mode). Alternatively, in some instances, it may be required to transition to RRC connected mode to provide measurement reports on the uplink.

Assigning CSI-RS resources for inactive mode measurements in such a manner may further help maintain good paging performance, which may further help reduce access delay, at least according to some embodiments.

A UE may be paged for CSI-RS resources using its I-RNTI while the UE is still in the same cell if its serving gNB maintains a C-RNTI to I-RNTI mapping table. Additionally, if the UE moves out of the cell while in the same RNA, the UE could send a RNA update, e.g., to facilitate provision of CSI-RS resources to the UE while in inactive mode in the new cell. Aperiodic CSI-RS resources or new periodic CSI-RS resources (e.g., due to UE mobility) can also be configured using DCI.

In some instances, it may be possible that a UE is not configured with CSI-RS resources while in inactive mode. In such instances, the UE may be able to use SSB based cell measurements while in inactive mode.

In some instances, it may be possible that a measurement gap could be configured for inter-frequency measurements based on CSI-RS while in inactive mode.

Figure 9:
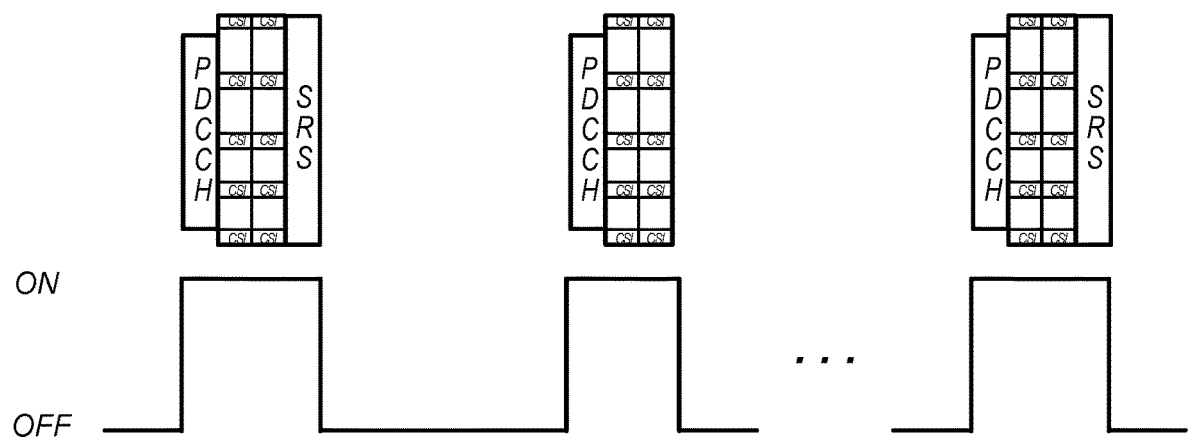

In some instances, it may be possible for a UE to transmit sounding reference signals (SRS) with a longer periodicity (e.g., a multiple of the DRX cycle length in inactive mode) or only when the downlink quality level is below a pre-set threshold. If the gNB can detect whether the SRS is transmitted, the UE may be able to further reduce power by combining such approaches together. As similarly described with respect to CSI-RS, a gNB may be able to use DCI to notify a UE to change to different SRS settings. As an example, FIG. 9 illustrates a possible communication timeline in which SRS transmissions are configured on a periodic basis with a periodicity that is a multiple of the DRX cycle length in inactive mode.

As a still further possibility, one or more inactivity timers could be used in conjunction with RRC inactive mode. For example, CSI-RS could be configured for measurement purposes in RRC inactive mode within an inactivity timer after a state transition from RRC connected mode. Such an inactivity timer could be reset when the RRC state changes and/or the UE has downlink or uplink traffic, and may help resolve the potential for confusion between I-RNTI and C-RNTI if the UE does not report a RNA update after a cell change.

With such an inactivity timer based design, it may be the case that transitions from RRC connected mode to RRC inactive mode may be more common, which may help conserve network resources (e.g., by shutting down any radio bearers for UEs that transition to inactive mode) and reduce UE power consumption, e.g., since good performance and low access time may be better supported for the duration of the inactivity timer as a result of use of CSI-RS resource based measurements. If the inactivity timer expires, it may be likely that there is no further imminent upcoming traffic for the UE, and so as one possibility it may be the case that expiry of the RRC inactive mode inactivity timer triggers a transition from the RRC inactive mode to RRC idle mode. Alternatively, if expiry of the RRC inactive mode inactivity timer is not configured to trigger a transition from the RRC inactive mode to RRC idle mode, the UE may remain in the RRC inactive mode but may use SSBs for cell measurements (e.g., since CSI-RS resources may not be configured after expiry of the inactivity timer). The potential power inefficiency with the mis-alignment of the SSBs with the CORESET used during wakeup occasions may make it more reasonable to move relatively quickly to RRC idle after expiry of the inactivity timer. If desired, another (e.g., longer) inactivity timer can be used to trigger a transition from RRC inactive to RRC idle.

Figure 10:
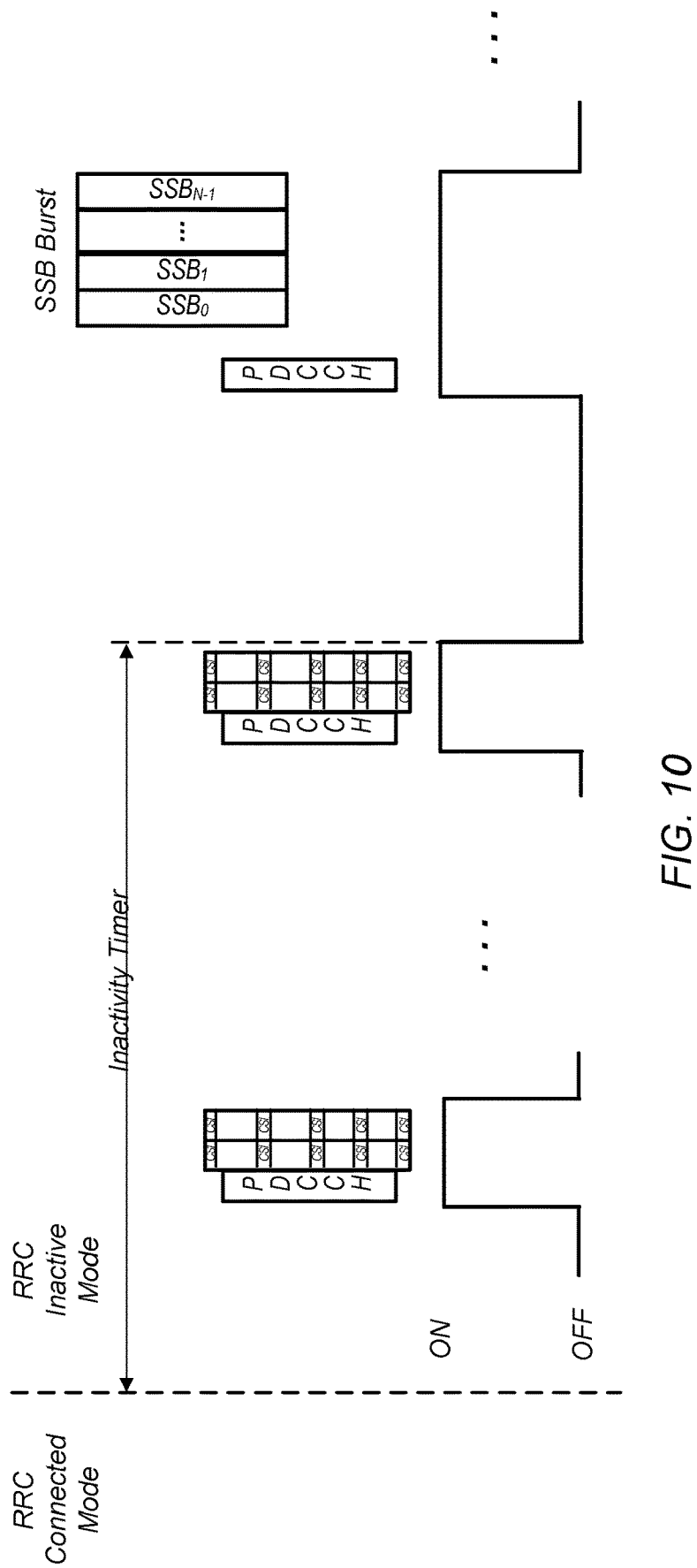

As an example, FIG. 10 illustrates a possible communication timeline in which an inactivity timer is used while in RRC inactive mode. As shown, in the illustrated scenario the UE may utilize configured CSI-RS resources to perfom cell measurements until expiry of the inactivity timer, after which the UE may perform cell measurements based on SSB transmissions.

In the following further exemplary embodiments are provided.

One set of embodiments may include a method, comprising: by a wireless device: receiving an indication of reference signal resources configured for use by the wireless device in a radio resource control (RRC) inactive mode; and performing cell measurements using the indicated reference signal resources while in the RRC inactive mode.

According to some embodiments, the reference signal resources comprise channel state information reference signal (CSI-RS) resources.

According to some embodiments, the reference signal resources comprise reference signal resources that are aligned in one or more of time or frequency with a control resource set provided for a wakeup occasion of the wireless device while in the RRC inactive mode.

According to some embodiments, the indication of the reference signal resources is received in downlink control information during a wakeup occasion of the wireless device while in the RRC inactive mode.

According to some embodiments, the indication of the reference signal resources is received in an indication to transition from RRC connected mode to RRC inactive mode.

According to some embodiments, the reference signal resources comprise a semi-persistent periodic set of reference signal resources.

According to some embodiments, the method further comprises, at a later time: receiving an indication of new reference signal resources for use by the wireless device in the RRC inactive mode; and performing cell measurements using the new reference signal resources while in the RRC inactive mode.

According to some embodiments, the new reference signal resources are received after a cell-reselection by the wireless device.

According to some embodiments, the reference signal resources are configured with a same beam configuration as used by the wireless device while in an RRC connected mode.

According to some embodiments, the method further comprises, while in the inactive mode: receiving an indication of an aperiodic reference signal resource assignment that supports a receiver beam sweep during a wakeup occasion of the wireless device while in the RRC inactive mode based at least in part on performing the cell measurements using the indicated reference signal resources while in the RRC inactive mode.

According to some embodiments, the method further comprises: providing cell measurement reports while in the RRC inactive mode based at least in part on performing the cell measurements using the indicated reference signal resources while in the RRC inactive mode.

According to some embodiments, the method further comprises: re-selecting to a new cell while in the RRC inactive mode, wherein the cell re-selection is within a Radio Access Network Notification Area (RNA); and providing a RNA update based at least in part on the cell re-selection within the RNA.

According to some embodiments, the reference signal resources comprise resources configured for transmitting sounding reference signals in the RRC inactive mode.

According to some embodiments, the method further comprises: determining that an RRC inactive mode inactivity timer has expired; and performing cell measurements using synchronization signal block transmissions after the RRC inactive mode inactivity timer has expired.

According to some embodiments, the method further comprises: transitioning to RRC idle mode after the RRC inactive mode inactivity timer has expired based at least in part on determining that the RRC inactive mode inactivity timer has expired.

Another set of embodiments may include a method, comprising: by a cellular base station: providing an indication of reference signal resources configured for use by a wireless device in a radio resource control (RRC) inactive mode; and providing the reference signal resources configured for use by the wireless device while the wireless device is in the RRC inactive mode.

Another exemplary embodiment may include a device, comprising: an antenna; a radio coupled to the antenna; and a processing element operably coupled to the radio, wherein the device is configured to implement any or all parts of the preceding examples.

A yet further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising: a processor configured to cause a wireless device to:
   receive an indication of reference signal resources configured for use by the wireless device in a radio resource control (RRC) inactive mode from a cellular base station that provides a serving cell to the wireless device, wherein the reference signal resources comprise channel state information reference signal (CSI-RS) resources; and
   perform cell measurements for the serving cell using the indicated reference signal resources while in the RRC inactive mode.

2. The apparatus of claim 1,
   wherein the reference signal resources comprise reference signal resources that are aligned in one or more of time or frequency with a control resource set provided for a wakeup occasion of the wireless device while in the RRC inactive mode.

3. The apparatus of claim 1, wherein the processor is further configured to cause the wireless device to:
   receive the indication of the reference signal resources from the cellular base station in downlink control information during a wakeup occasion of the wireless device while in the RRC inactive mode.

4. The apparatus of claim 1, wherein the processor is further configured to cause the wireless device to:
   receive the indication of the reference signal resources from the cellular base station in an indication to transition from RRC connected mode to RRC inactive mode.

5. The apparatus of claim 1,
   wherein the reference signal resources comprise a semi-persistent periodic set of reference signal resources.

6. The apparatus of claim 1, wherein the processor is further configured to cause the wireless device to, at a later time:
   receive an indication of new reference signal resources for use by the wireless device in the RRC inactive mode; and
   perform cell measurements using the new reference signal resources while in the RRC inactive mode.

7. The apparatus of claim 6,
   wherein the new reference signal resources are received after a cell re-selection by the wireless device.

8. A wireless device, comprising:
   a plurality of antennas;
   a radio operably coupled to the plurality of antennas; and
   a processor operably coupled to the radio;
   wherein the wireless device is configured to:
      receive an indication of reference signal resources configured for use by the wireless device in a radio resource control (RRC) inactive mode from a cellular base station that provides a serving cell to the wireless device, wherein the reference signal resources comprise channel state information reference signal (CSI-RS) resources; and
      perform cell measurements using the indicated reference signal resources while in the RRC inactive mode.

9. The wireless device of claim 8,
   wherein the reference signal resources are configured with a same beam configuration as used by the wireless device while in an RRC connected mode.

10. The wireless device of claim 8, wherein the wireless device is further configured to, while in the inactive mode:
    receive an indication of an aperiodic reference signal resource assignment that supports a receiver beam sweep during a wakeup occasion of the wireless device while in the RRC inactive mode based at least in part on performing the cell measurements using the indicated reference signal resources while in the RRC inactive mode.

11. The wireless device of claim 8, wherein the wireless device is further configured to:
    provide cell measurement reports to the serving cell while in the RRC inactive mode based at least in part on performing the cell measurements using the indicated reference signal resources while in the RRC inactive mode.

12. The wireless device of claim 8, wherein the wireless device is further configured to:
    re-select to a new cell while in the RRC inactive mode, wherein the cell re-selection is
    within a Radio Access Network Notification Area (RNA); and provide a RNA update based at least in part on the cell re-selection within the RNA.

13. The wireless device of claim 8, wherein the reference signal resources further comprise resources configured for transmitting sounding reference signals in the RRC inactive mode.

14. The wireless device of claim 8, wherein the wireless device is further configured to:
   determine that an RRC inactive mode inactivity timer has expired; and
   perform cell measurements using synchronization signal block transmissions after the RRC inactive mode inactivity timer has expired.

15. The wireless device of claim 14, wherein the wireless device is further configured to:
   transition to RRC idle mode after the RRC inactive mode inactivity timer has expired based at least in part on determining that the RRC inactive mode inactivity timer has expired.

16. The wireless device of claim 8, wherein the CSI-RS resources are aligned in one or more of time or frequency with a control resource set provided for a wakeup occasion of the wireless device while in the RRC inactive mode.

17. A cellular base station, comprising:
   a plurality of antennas;
   a radio operably coupled to the plurality of antennas; and
   a processor operably coupled to the radio;
   wherein the cellular base station is configured to:
      provide an indication of reference signal resources configured for use by a wireless device in a radio resource control (RRC) inactive mode, wherein the reference signal resources comprise channel state information reference signal (CSI-RS) resources; and
      provide the reference signal resources configured for use by the wireless device while the wireless device is in the RRC inactive mode.

18. The cellular base station of claim 17, wherein the cellular base station is further configured to:
   provide a control resource set during a wakeup occasion of the wireless device while in the RRC inactive mode, wherein the reference signal resources are aligned in one or more of time or frequency with the control resource set.

19. The cellular base station of claim 17, wherein the cellular base station is further configured to provide the indication of the reference signal resources in one of:
   downlink control information provided during a wakeup occasion of the wireless device while the wireless device is in the RRC inactive mode; or
   an indication to transition from RRC connected mode to RRC inactive mode.

20. The cellular base station of claim 17, wherein the reference signal resources comprise resources configured for transmitting sounding reference signals in the RRC inactive mode, wherein the cellular base station is further configured to:
   receive the sounding reference signals from the wireless device in the RRC inactive mode.

* * * * *